(12) United States Patent
Tsien et al.

(10) Patent No.: US 11,487,340 B1
(45) Date of Patent: Nov. 1, 2022

(54) PROBE FILTER RETENTION BASED LOW POWER STATE

(71) Applicant: Advanced Micro Devices, Inc., Santa Clara, CA (US)

(72) Inventors: Benjamin Tsien, Fremont, CA (US); Amit P. Apte, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/357,104

(22) Filed: Jun. 24, 2021

(51) Int. Cl.
| | |
|---|---|
| G06F 1/3228 | (2019.01) |
| G06F 13/26 | (2006.01) |
| G06F 12/0831 | (2016.01) |
| G06F 1/3296 | (2019.01) |
| G06F 1/3234 | (2019.01) |

(52) U.S. Cl.
CPC .......... *G06F 1/3228* (2013.01); *G06F 1/3275* (2013.01); *G06F 1/3296* (2013.01); *G06F 12/0833* (2013.01); *G06F 13/26* (2013.01); *Y02D 10/00* (2018.01)

(58) Field of Classification Search
CPC .. G06F 1/3275; G06F 1/3296; G06F 12/0833; G06F 13/26; G06F 1/3228; Y02D 10/00
See application file for complete search history.

(56) References Cited

U.S. PATENT DOCUMENTS

| | | | |
|---|---|---|---|
| 2017/0177484 A1* | 6/2017 | Conway | G06F 12/0833 |
| 2019/0196574 A1* | 6/2019 | Tsien | G06F 1/3296 |
| 2021/0200299 A1* | 7/2021 | Liang | G06F 3/0658 |

* cited by examiner

*Primary Examiner* — Terrell S Johnson
(74) *Attorney, Agent, or Firm* — Polansky & Associates, P.L.L.C.; Paul J. Polansky; Nathan H. Calvert

(57) ABSTRACT

A data fabric routes requests between the plurality of requestors and the plurality of responders. The data fabric includes a crossbar router, a coherent slave controller coupled to the crossbar router, and a probe filter coupled to the coherent slave controller and tracking the state of cached lines of memory. Power state control circuitry operates, responsive to detecting any of a plurality of designated conditions, to cause the probe filter to enter a retention low power state in which a clock signal to the probe filter is gated while power is maintained to the probe filter. Entering the retention low power state is performed when all in-process probe filter lookups are complete.

20 Claims, 6 Drawing Sheets

PROBE FILTER RETENTION BASED LOW POWER STATE

BACKGROUND

Computer systems utilize a variety of peripheral components for different input/output and communication functions. A system-on-chip (SOC) combines data processing circuits such as central processing unit (CPU) cores and a graphics processing unit (GPU) with peripheral controllers and memory interfaces on single integrated circuit chip and is well-suited for portable, battery-powered operation. For example, an SOC could incorporate a display controller, an image signal processor (ISP), and other peripheral controllers on the SOC to enable the input and output of information to and from the computer system. In such large and complex SOCs, the devices typically transfer data between resources such as memory by routing accesses through a large, on-chip routing circuit or "data fabric".

The diversity of the circuits on a typical SOC presents problems for implementing power-saving modes. Many of the peripheral controllers operate real-time and are isochronous, requiring a certain amount of bandwidth to shared memory resources over a certain period of time. This requirement has frustrated the implementation of chip-wide low-power states. For example, when the CPU cores and the GPU are idle, a peripheral controller may still be active and receiving data that it can store in a buffer, but must send the data to memory before the buffer fills up.

CPUs and GPUs, on the other hand, tend to have periods of high activity separated by idle periods. When the idle periods are expected to be short, the data fabric, memory controllers, and memories typically remain active so they can quickly service requests from the peripheral controllers to transfer more data.

Figure 1:
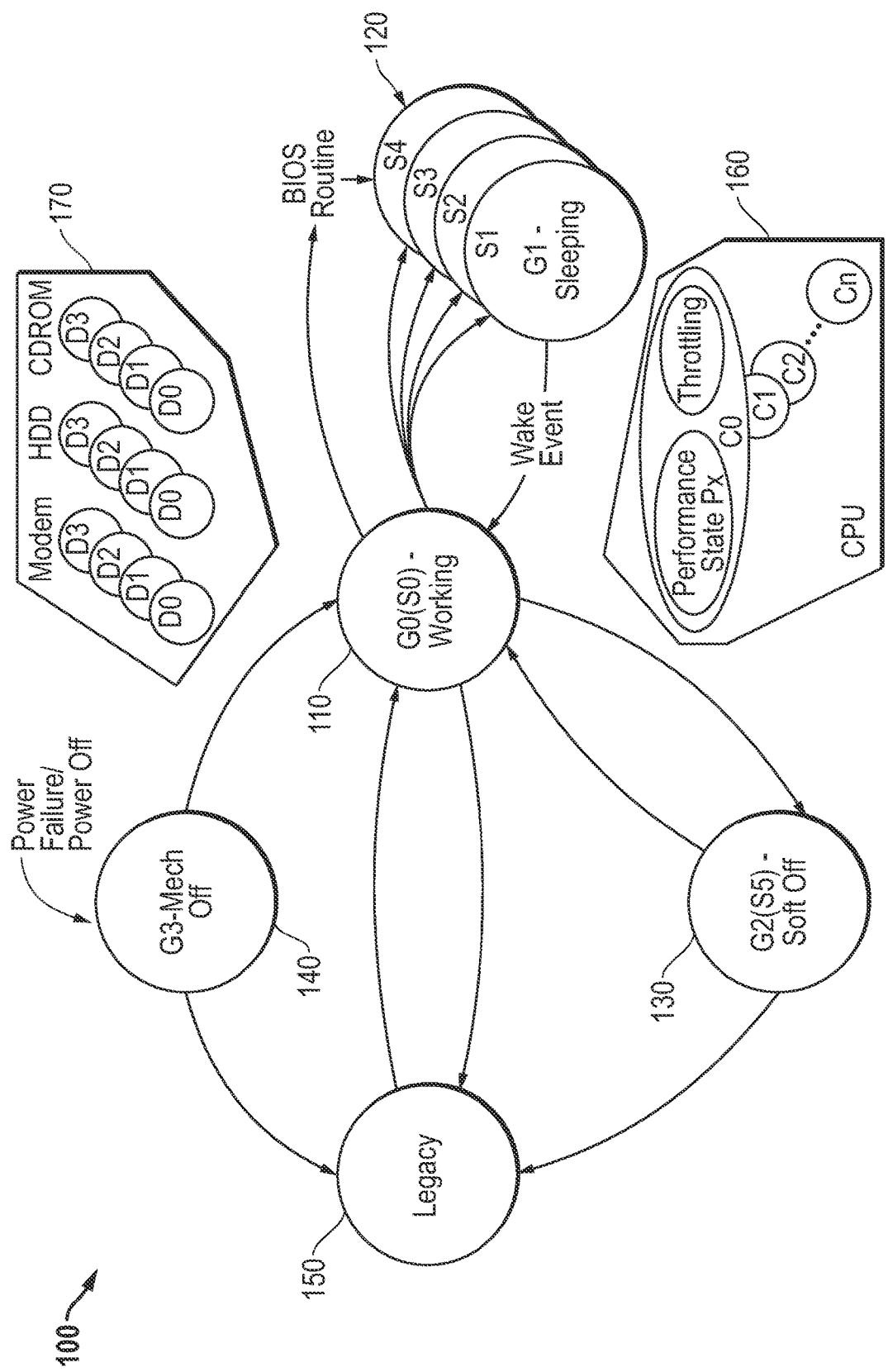
FIG. 1 illustrates in block diagram form an Advanced Configuration and Power Interface (ACPI) model for computer system power states known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processor includes a plurality of requestors, a plurality of responders, and a data fabric. The data fabric is for routing requests between the plurality of requestors and the plurality of responders, and includes a crossbar router, a coherent slave controller connected to the crossbar router, and a probe filter connected to the coherent slave controller, and power state control circuitry. The probe filter tracks the state of cached lines of memory. The power state control circuitry is operable, responsive to detecting any of a plurality of designated conditions, to cause the probe filter to enter a retention low power state in which a clock signal to the probe filter is gated while power is maintained to the probe filter. Entering the retention low power Entering the retention low power state is performed when all in-process probe filter lookups are complete.

A method includes at a data fabric of a data processor, routing requests between a plurality of requestors and a plurality of responders. At a probe filter coupled to the data fabric, the state of cached lines of memory are tracked. A condition eligible for a probe filter retention low power state is detected, and in response, a coherent slave controller is commanded to inhibit or disable new probe filter lookups. A clock signal fed to the probe filter is gated.

A power state control circuit controls power states of a data fabric. The power state control circuit power state control circuitry, first clock gating circuitry, and second clock gating circuitry. The power state control circuitry is operable, responsive to detecting any of a plurality of designated conditions, to cause a probe filter of the data fabric to enter a retention low power state in which a clock signal to the probe filter is gated while power is maintained to the probe filter. The first clock gating circuitry is connected to the power state control circuitry for selectively gating a first clock signal to the probe filter. The second clock gating circuitry is coupled to the power state control circuitry for selectively gating a second clock signal to the data fabric. Entering the retention low power state is performed when all in-process probe filter lookups are complete.

FIG. 1 illustrates in block diagram form an Advanced Configuration and Power Interface (ACPI) model 100 for computer system power states known in the prior art. ACPI model 100 is part of the APCI Specification developed by various computer system, software, and component vendors to establish industry standard interfaces for device configuration and power management of both devices and entire computer systems.

ACPI model 100 defines a hierarchy of states of various devices in the computer system organized around a set of global system states including a G0(S0) state 110 known as the "Working" state, a G1 state 120 state known as the "Sleeping" state, a G2(S5) state 130 known as the "Soft Off" state, and a G3 state 140 known as "Mechanical Off" state. In addition, ACPI model 100 includes a state 150 known as the "Legacy" state that accommodates pre-existing basic input/output system (BIOS) power management interfaces that correspond to BIOS operation before a ACPI-compatible operating system loads. ACPI model 100 also defines a set of central processing unit (CPU) states 160, and a set of device states or "D" states 170 for devices such as modems, hard disk drives (HDDs), and compact disc read only memories (CDROMs).

ACPI model 100 is well-known and most aspects will not be discussed further. However certain aspects relating to power states of the central processing unit are relevant to understanding the present disclosure and will now be discussed.

In G0(S0) state 110, peripheral devices can have their power state changed dynamically, while the user can select, through a user interface, various performance and power characteristics of the system so that the software system can optimize the computer for the desired performance or battery life. In this state, the computer system responds to external events in real time. From the G0(S0) state, the computer system can transition to G1 state 120, which includes various power-saving sleeping states or "S-states" under the control of system firmware such as the BIOS, and return to the working state in response to a wake event.

In G0(S0) state 110, the CPU is capable of operating in various states including a "C0" state in which the processor executes instructions, as well as various lower power or "idle" states labeled "C1" through "Cn". In the C0 state, the CPU is capable of operating in various performance states or "P-states", in which the frequency of operation can be increased or throttled to support the needs of currently-running application programs using dynamic voltage and frequency scaling (DVFS). In idle states C1-Cn, the CPU is idle and does not execute instructions but has various combinations of power consumption and wakeup latency, in which lower power consumption is traded off with longer wakeup latency. So for example, in the C1 state, power consumption is the highest but wakeup latency is the shortest, whereas in the Cn state power consumption is the lowest but wakeup latency is the longest.

Using ACPI model 100, each particular computer system may support different combinations of P-states and C-states as appropriate for the application environment. Achieving better tradeoffs between reduced power consumption and low latency in ways not specified by ACPI model 100 continues to be a desirable goal.

Figure 2:
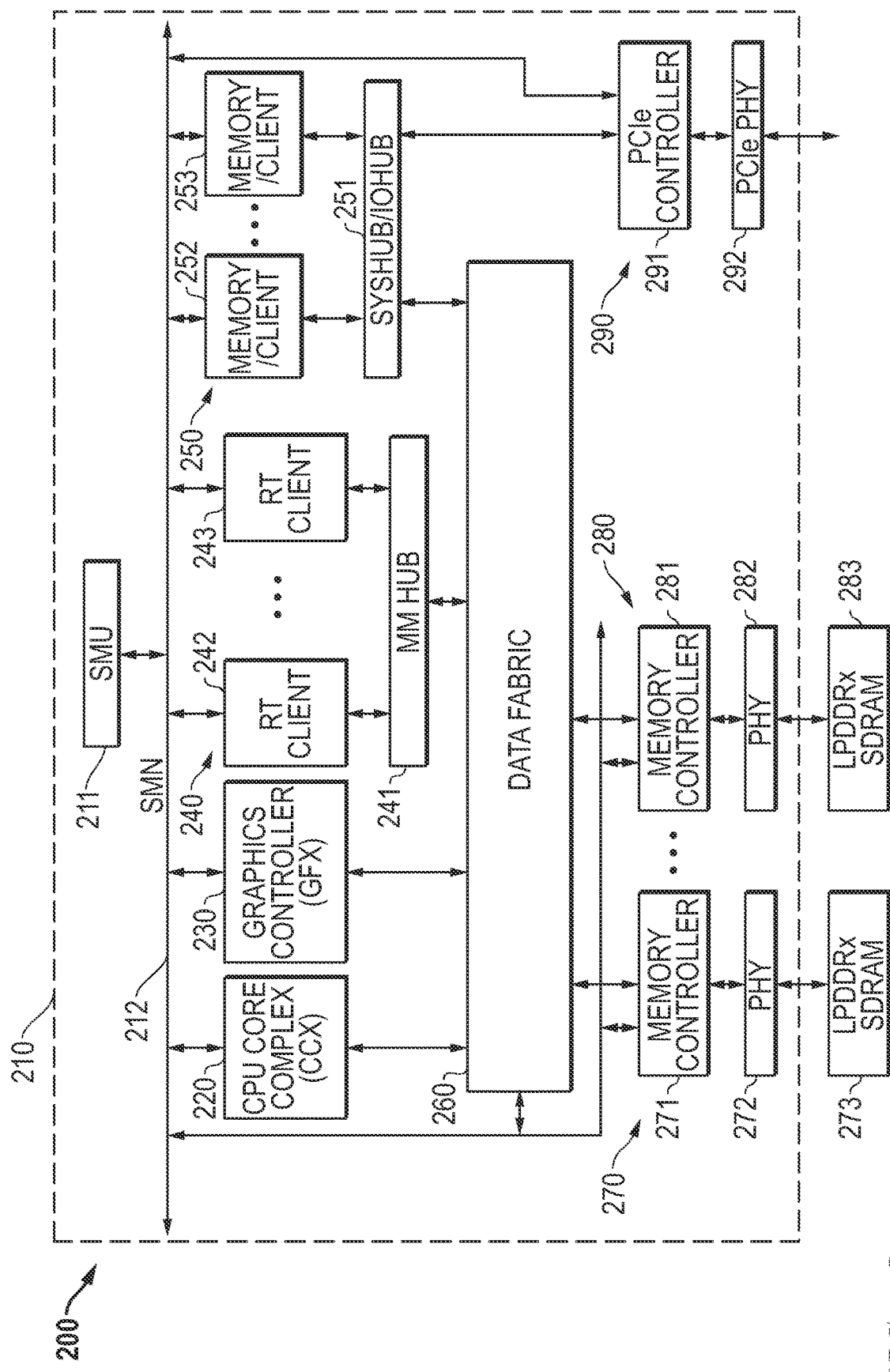
FIG. 2 illustrates in block diagram form a data processing system according to some embodiments.

FIG. 2 illustrates in block diagram form a data processing system 200 according to some embodiments. Data processing system 200 includes a data processor in the form of an SOC 210 and external memory in the form of low-power Double Data Rate synchronous dynamic random-access memories (LPDDRx SDRAMs) 273 and 283. Many other components of an actual data processing system are typically present but are not relevant to understanding the present disclosure and are not shown in FIG. 2 for ease of illustration.

SOC 210 includes generally a system management unit (SMU) 211, a system management network (SMN) 212, a central processing unit (CPU) core complex 220 labeled "CCX", a graphics controller 230 labeled "GFX", a real-time client subsystem 240, a memory/client subsystem 250, a data fabric 260, memory channels 270 and 280, and a Peripheral Component Interface Express (PCIe) subsystem 290. As will be appreciated by a person of ordinary skill, SOC 210 may not have all of these elements present in every embodiment and, further, may have additional elements included therein.

SMU 211 is bidirectionally connected to the major components in SOC 210 over SMN 212. SMN 212 forms a control fabric for SOC 210. SMU 211 is a local controller that controls the operation of the resources on SOC 210 and synchronizes communication among them. SMU 211 manages power-up sequencing of the various processors on SOC 210 and controls multiple off-chip devices via reset, enable and other signals. SMU 211 includes one or more clock sources (not shown), such as a phase locked loop (PLL), to provide clock signals for each of the components of SOC 210. SMU 211 also manages power for the various processors and other functional blocks, and may receive measured power consumption values from CPU cores in CPU core complex 220 and graphics controller 230 to determine appropriate P-states.

CPU core complex 220 includes a set of CPU cores, each of which is bidirectionally connected to SMU 211 over SMN 212. Each CPU core may be a unitary core only sharing a last-level cache with the other CPU cores, or may be combined with some but not all of the other cores in clusters.

Graphics controller 230 is bidirectionally connected to SMU 211 over SMN 212. Graphics controller 230 is a high-performance graphics processing unit capable of performing graphics operations such as vertex processing, fragment processing, shading, texture blending, and the like in a highly integrated and parallel fashion. In order to perform its operations, graphics controller 230 requires periodic access to external memory. In the embodiment shown in FIG. 2, graphics controller 230 shares a common memory subsystem with CPU cores in CPU core complex 220, an architecture known as a unified memory architecture. Because SOC 210 includes both a CPU and a GPU, it is also referred to as an accelerated processing unit (APU).

Real-time client subsystem 240 includes a set of real-time clients such as representative real time clients 242 and 243, and a memory management hub 241 labeled "MM HUB". Each real-time client is bidirectionally connected to SMU 211 over SMN 212, and to memory management hub 241. Real-time clients could be any type of peripheral controller that require periodic movement of data, such as an image signal processor (ISP), an audio coder-decoder (codec), a display controller that renders and rasterizes objects generated by graphics controller 230 for display on a monitor, and the like.

Memory/client subsystem 250 includes a set of memory elements or peripheral controllers such as representative memory/client devices 252 and 253, and a system and input/output hub 251 labeled "SYSHUB/IOHUB". Each memory/client device is bidirectionally connected to SMU 211 over SMN 212, and to system and input/output hub 251. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 260 is an interconnect that controls the flow of traffic in SOC 210. Data fabric 260 is bidirectionally connected to SMU 211 over SMN 212, and is bidirectionally connected to CPU core complex 220, graphics controller 230, memory management hub 241, system and input/output hub 251. Data fabric 260 includes a crossbar switch for routing memory-mapped access requests and responses between any of the various devices of SOC 210. It includes a system memory map, defined by a basic input/output system (BIOS), for determining destinations of memory accesses based on the system configuration, as well as buffers for each virtual connection.

Memory channels 270 and 280 are circuits that control the transfer of data to and from external memories 273 and 283. Memory channel 270 is formed by a memory controller 271 and a physical interface circuit 272 labeled "PHY" connected to external memory 273. Memory controller 271 is bidirectionally connected to SMU 211 over SMN 212 and has an upstream port bidirectionally connected to data fabric 260, and a downstream port. Physical interface circuit 272 has an upstream port bidirectionally connected to memory controller 271, and a downstream port bidirectionally connected to external memory 273. Similarly, memory channel 280 is formed by a memory controller 281 and a physical interface circuit 282 connected to external memory 283.

Memory controller 281 is bidirectionally connected to SMU 211 over SMN 212 and has an upstream port bidirectionally connected to data fabric 260, and a downstream port. Physical interface circuit 282 has an upstream port bidirectionally connected to memory controller 281, and a downstream port bidirectionally connected to external memory 283.

Peripheral Component Interface Express (PCIe) subsystem 290 includes a PCIe controller 291 and a PCIe physical interface circuit 292. PCIe controller 291 is bidirectionally connected to SMU 211 over SMN 212 and has an upstream port bidirectionally connected to system and input/output hub 251, and a downstream port. PCIe physical interface circuit 292 has an upstream port bidirectionally connected to PCIe controller 291, and a downstream port bidirectionally connected to a PCIe fabric, not shown in FIG. 2. PCIe controller is capable of forming a PCIe root complex of a PCIe system for connection to a PCIe network including PCIe switches, routers, and devices.

In operation, SOC 210 integrates a complex assortment of computing and storage devices, including CPU core complex 220 and graphics controller 230, on a single chip. Most of these controllers are well-known and will not be discussed further. SOC 210 also implements various system monitoring and power saving functions, including P-state elevation and throttling and C-state entry and exit under the control of SMU 211 and/or operating system software.

For example, SOC 210 controls entry into and exit from various idle states of CPU core complex 220 and graphics controller 230 based on idle periods in which no instructions are executing. As is known, when CPU core complex 220 and graphics controller 230 all enter idle states, other components of SOC 210 can also be placed into appropriate idle states to save power. In one example, CPU core complex 220 supports two idle states including a shallow idle state (C1) and a deep idle state (C6) state. According to the ACPI mode, the C1 state is the lightest C-state and may merely involve clock gating and a reduction in power supply voltage that allows SOC 210 to retain its state but also to return to an active state with very low latency. On the other hand, the C6 state is a very deep C-state and reduces power consumption by gating various clock signals and power supply voltages, but it also has a very a long exit latency.

In some known systems, other components of SOC 210 may also be placed in various idle states to correspond to the idle states of the data processing elements. In one particular example, when each CPU and the GPU enter the C1 state, the data fabric and memory system remain fully operational, but consume significant power when they are generally not needed. When each CPU and the GPU enter the C6 state, however, data fabric 260 is also placed into a corresponding idle power state with power gating or clock gating. Before the data fabric enters this idle power state, it places the external memory into the self-refresh state and places the memory controller and PHY into a similar low-power state.

Figure 3:
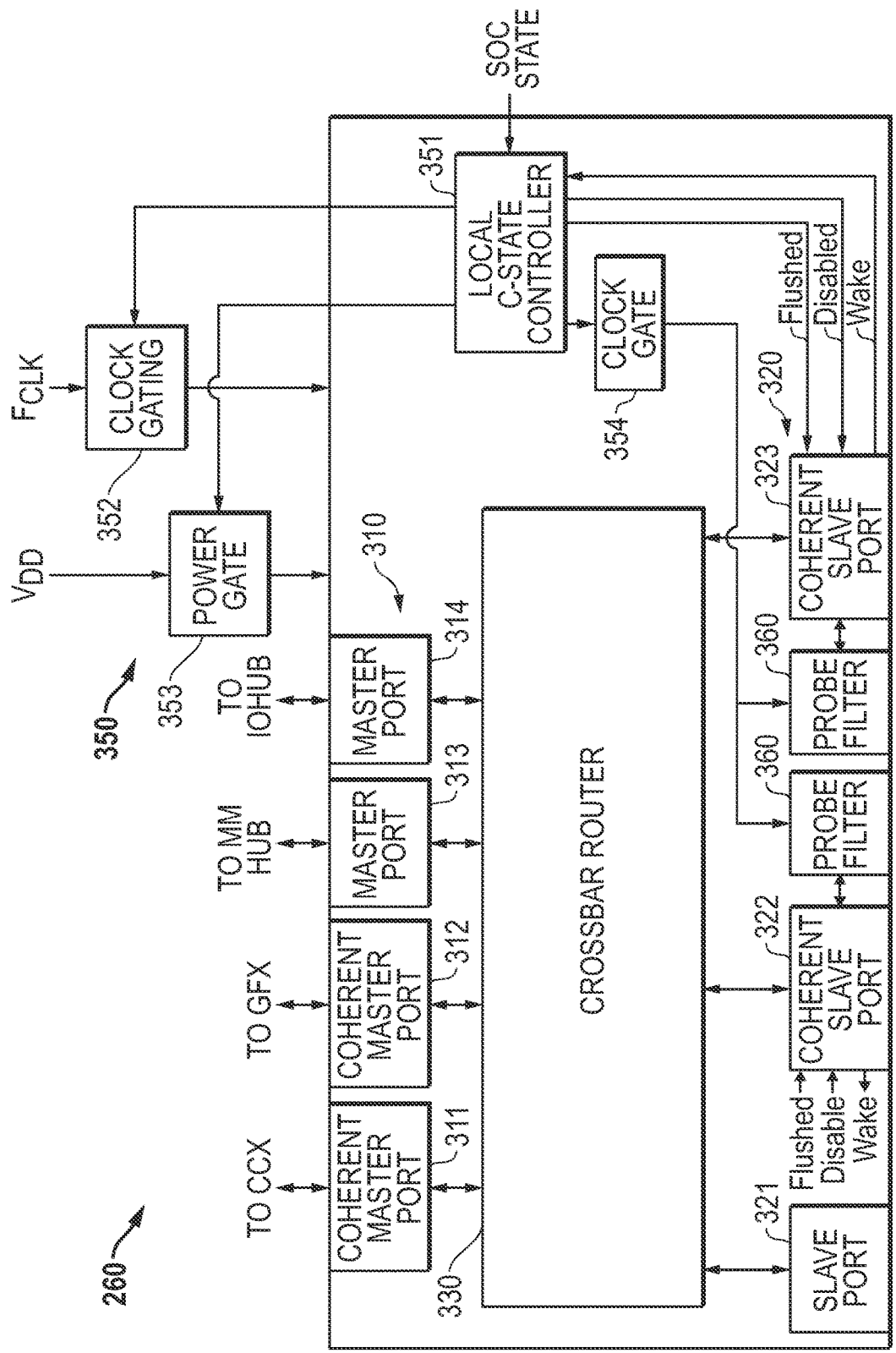
FIG. 3 illustrates in block diagram form the data fabric of FIG. 2 according to some embodiments.

FIG. 3 illustrates in block diagram form data fabric 260 of FIG. 2 according to some embodiments. Data fabric 260 includes a set of master ports 310, a set of slave ports 320, a crossbar router 330, and a power controller circuit 350.

Master ports 310 include ports for each device capable of generating memory access requests including representative coherent master ports 311 and 312, and representative master ports 313 and 314. Each of ports 311, 312, 313 and 314 is adapted to be bidirectionally connected to a corresponding requesting device as shown in FIG. 2, and has a bidirectional downstream port. Each master port has an internal FIFO buffer for temporarily storing accesses. Coherent master ports 311 and 312 connect in the upstream direction to coherent requestors such as CCX 220, GFX 230, or other CPU or GPU requestors in various embodiments. Master ports 313 and 314 are connected in the upstream direction through MM hub 241 and IOHUB 251, respectively, to primarily non-coherent requestors such as display controllers or multimedia controllers.

Slave ports 320 include ports for each device capable of responding to memory access requests include representative slave port 321, and representative coherent slave ports 322 and 323. Each of slave ports 321, 322, and 323 has a bidirectional upstream port and is adapted to be bidirectionally connected to a corresponding responding device as shown in FIG. 2. Each slave port has an internal FIFO buffer for temporarily storing accesses. Coherent slave ports 322 and 323 are each bidirectionally connected to a respective probe filter 360 for tracking the state of cached lines of memory. Each coherent slave port includes a coherent slave controller for the port.

Crossbar router 330 has bidirectional connections to the downstream bidirectional connections of master ports 310 and bidirectional connections to the upstream bidirectional connections of slave ports 320. Crossbar router 330 is the heart of data fabric 260 and forms virtual connections between masters and slaves based on the destination addresses of the requestors by routing access between a master port and a corresponding slave port.

Power controller circuit 350 includes a local C-state controller 351, a clock gate circuit 352, a power gate circuit 353, and a probe filter clock gate 345. Local C-state controller 351 has a first input for receiving a signal labeled "SOC STATE", a first output connected to probe filter clock gate 354, a second output connected to coherent slave ports 322 and 323 carrying a signal labeled "Flushed", a third output connected to coherent slave ports 322 and 323 carrying a signal labeled "Disable", a fourth output connected to coherent slave ports 322 and 323 carrying a signal labeled "Wake", a fifth and sixth outputs. Clock gate circuit 352 has an input for receiving a data fabric clock signal labeled "$F_{CLK}$", a control input connected to the fifth output of local C-state controller 351, and an output for providing a selectively gated clock signal to data fabric 260. Power gate circuit 353 has an input for receiving a data fabric power supply voltage labeled "$V_{DD}$", a control input connected to the sixth output of local C-state controller 351, and an output for providing a selectively gated power supply voltage to data fabric 260.

Probe filter clock gate 354 has an input (not shown) receiving clock signal $F_{CLK}$, from clock gate circuit 352, and an output connected to probe filters 360. Probe filter clock gate 354 operates to selectively under control of C-state controller 351 to gate the clock signal to probe filters 360 to provide a low power retention state in which a clock signal to probe filter 354 is gated while power is maintained to the probe filter, as further described below.

Generally, data fabric 260 routes memory access requests and responses between requestors (such a CPU core, the GPU, a real-time client controller, and the like) and responders (such as external memory through the memory controllers and PHYs, an on-chip memory, and the like). In some scenarios, the data fabric 260 implements a retention low power state in which the probe filter is clock gated but retains power. This retention low power state is employed with a C-state in which probe filters 360 are not power gated, but instead are clock gated. Caches for CCX 220, such as level 3 caches, are flushed in some scenarios where this retention low power state is employed, but are not flushed in other scenarios.

Power controller circuit 350 is operable, responsive to detecting any of a plurality of designated conditions, to cause the probe filter to enter the retention low power state in which a clock signal to the probe filter is gated while power is maintained the probe filters 360. Entering the retention low power state includes coherent slave controllers 322 and 323 inhibiting new probe filter lookups and signaling to the power state control circuitry when all in-process probe filter lookups are complete.

In this embodiment, C-state controller 351 and probe filter clock gate 354 include power state control circuitry which operates to provide the retention low power state of the probe filter. This state is employed at selected times during a C-state of this embodiment, as well as at select times when data fabric 260 is active. The use of this state allows the probe filters 360 to save power when not in use by gating their clock signal, but maintain their power supply in order to retain the probe filter data. The power state control circuitry of C-state controller 351 is operable, responsive to detecting any of a plurality of designated conditions, to cause probe filters 360 to enter the retention low power state. As further described below, the process of entering the retention low power retention state includes a coherent slave controller, such as that in coherent slave ports 322 or 323, inhibiting new probe filter lookups and signaling to the power state control circuitry by de-asserting the "Wake" signal when all in-process probe filter lookups are complete.

Three designated conditions can each cause probe filters 360 to enter the retention low power state in this embodiment. These include a first condition in which all requestors that are probe filter clients have flushed their caches, a second condition in which APU 200 or other host data processor, or data fabric 260, have entered an idle power state, and a third condition in which the data processor enters a low power state in which only primarily non-coherent requestors are active. In some embodiments, only one or two of these conditions are supported.

Figure 4:
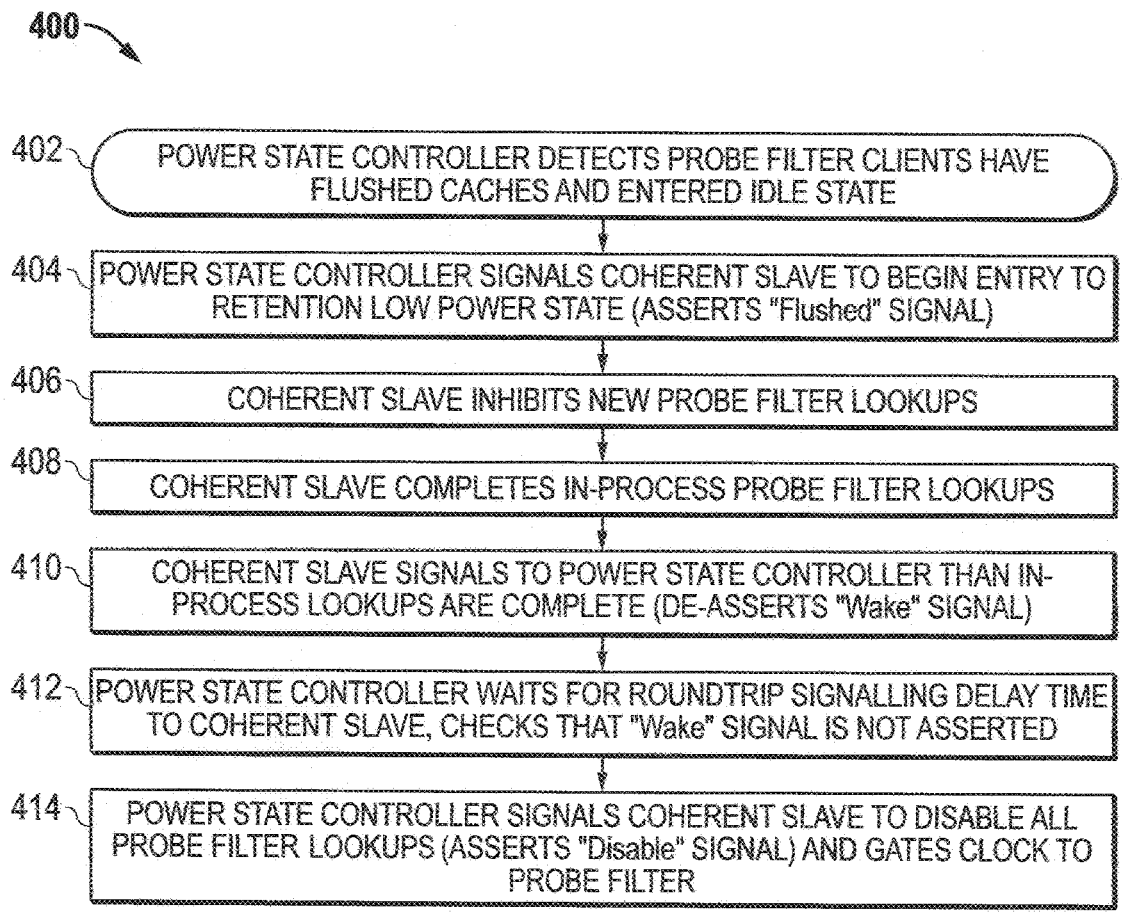
FIG. 4 shows a flowchart illustrating a process for entering a retention low power state according an exemplary embodiment.

FIG. 4 shows a flowchart 400 illustrating a process for entering a retention low power state according an exemplary embodiment. The depicted process is suitable for implementation with data fabric 260 under control of local C-state controller 351, or other suitable data fabric circuits including probe filter clock gating capability and a suitable power state controller power state control circuitry similar to that of local C-state controller 351.

The depicted process starts at block 402 where the local power state controller detects a designated condition that probe filter client requestors have flushed their caches and entered an idle state. In some embodiments, the probe filter clients include only CPU requestors, or only CPU and GPU requestors. Detecting the designated condition in this embodiment includes the by receiving a signal from a system level power state controller.

In response, at block 404 the local power state controller asserts the "Flushed" signal (FIG. 3) to signal the coherent slave controllers to begin entry to the probe filter's retention low power state. In the depicted scenario, this signal functions as a command for the coherent slave controllers to inhibit probe filter lookups. While multiple coherent slave controllers are described in this example, the process is used with only one coherent slave controller in some embodiments. Upon receiving this signal, at block 406, the coherent slave controllers begin inhibiting new probe filter lookups. Because the caches have been flushed, at block 405, the coherent slave controllers are able to treat all requests to previously cacheable memory addresses as cache misses and generate no probe filter lookups.

At block 408, the coherent slave controllers complete all probe filter lookups that were in process when the command to inhibit new probe filter lookups was received at block 404. When those in-process lookups have been completed, at block 410 the coherent slave controllers De-assert the Wake signal to signal to the power state controller that the in-process lookups are complete.

Upon receiving the de-asserted Wake signal, the local power state controller at block 412 waits for a delay time of at least the roundtrip signaling delay from the local power state controller to the coherent slave controllers and back. Then at block 414 the local power state controller signals the coherent slave controllers to disable all probe filter lookups by asserting the Disable signal. It also puts the probe filter into the retention low power state by activating clock gate 354 to gate the clock signal to the probe filter. In the retention low power state, the probe filter power supply is maintained, and the probe filter maintains the cache line state data held therein.

Figure 5:
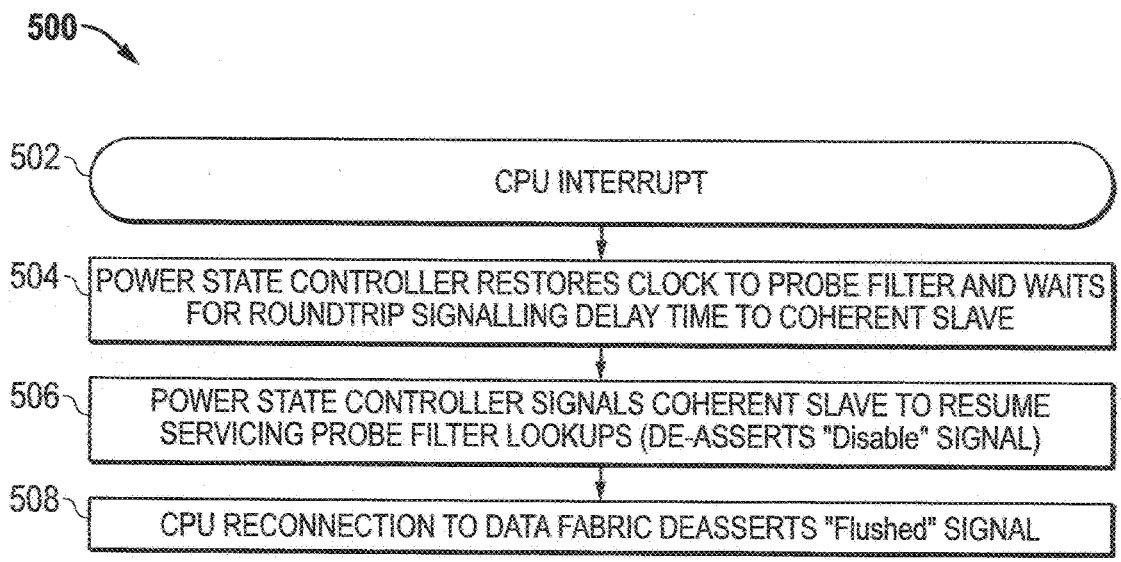
FIG. 5 shows a flowchart of a process for leaving the retention low power state process of FIG. 4.

FIG. 5 shows a flowchart 500 of a process for leaving the retention low power state of FIG. 4. The Flush, Disable, and Wake signals (FIG. 3) employed to control entry and exit from the retention low power state provide capability to enter and exit the retention low power state in various scenarios according to which of a number of designated conditions prompts entry to the state. The process of FIG. 5 is employed for an exit when the idle state conditions of block 402 (FIG. 4) cause the retention low power state entry.

At block 502, the process is started responsive to a CPU interrupt that causes the CPU to exit the idle state. In this embodiment, the SOC STATE signal provides this status to local C-state controller 351. In other embodiments, a similar signal is provided to a local power state controller. In response to receiving this signal, the local power state controller restores the clock signal to the probe filter, and waits for the roundtrip signaling delay time from the local power state controller to the coherent slave controllers.

Then at block 506, the local power state controller signals the coherent slave controllers to resume servicing probe filter lookups by de-asserting the Disable signal. Finally, as a part of the CPU process of leaving its idle state, it reconnects to the data fabric by opening a coherent master port. Responsive to this connection, the local power state controller de-asserts the Flushed signal to the coherent slave controllers, causing the coherent slave controllers to resume performing probe filter lookups.

Figure 6:
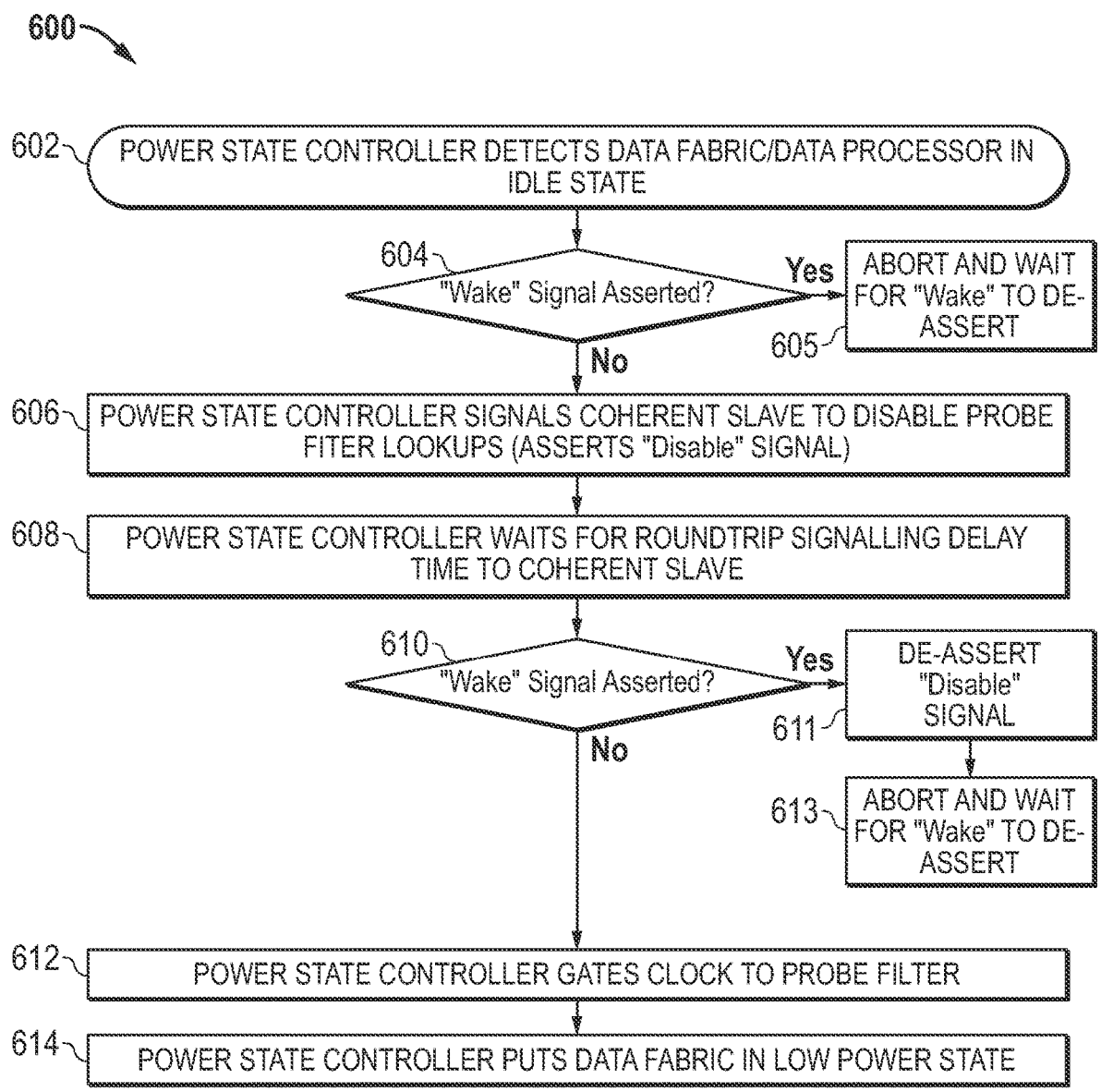
FIG. 6 shows a flowchart illustrating another process for entering a retention low power state according to another exemplary embodiment.

FIG. 6 shows a flowchart 600 illustrating another process for entering a retention low power state according to another exemplary embodiment. The depicted process is suitable for implementation with data fabric 260 under control of local C-state controller 351, or other suitable data fabric circuits.

In block 602, the process detects conditions for entering a low power state, such as the C-state described above, during an idle state for the APU which does not include flushed caches for the CPU. Because the CPU caches have not been flushed, the process of entering the retention low power state is different from that of FIG. 4.

At block 604, the, local power state controller determines if the Wake signal is asserted. If it is, indicating that a coherent slave controller is handling probe filter lookups, the process goes to block 605 where it temporarily aborts entering the retention low power state and waits for the Wake signal to de-assert. If the Wake signal is not asserted at block 604 (or when it is de-asserted at block 605), the process goes to block 606 where it signals the coherent slave controllers to disable probe filter lookups by asserting the Disable signal.

Then at block 608 the local power state controller waits for the roundtrip signaling delay time from the local power state controller to the coherent slave controllers. Following this wait, it again checks the if the Wake signal is asserted at block 610. If not, the process goes to block 612. If so, the local power state controller de-asserts the Disable signal at block 611 aborts the retention low power state entry process to wait for the Wake signal to de-assert at block 613. Then at block 614 the data fabric is put into a low power state such as the C-state described above.

The depicted sequence has the additional advantage of allowing the data fabric to move from an idle state to the C-state while allowing coherent requests to be serviced should they occur during the transition process.

Figure 7:
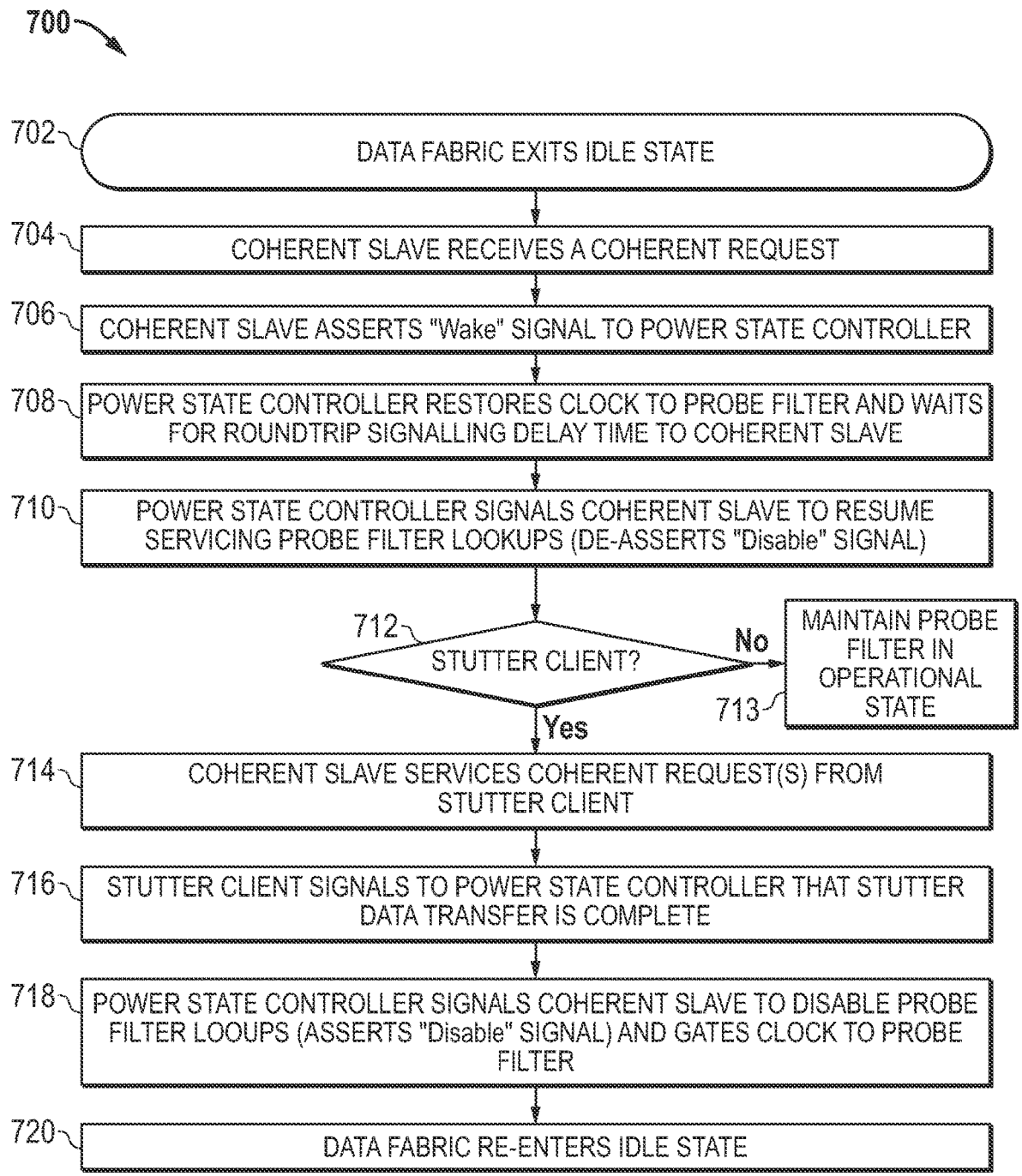
FIG. 7 shows a flowchart illustrating another process for leaving and entering a retention low power state according to an exemplary embodiment.

FIG. 7 shows a flowchart 700 illustrating another process for leaving and entering a retention low power state according to an exemplary embodiment. The depicted process is suitable for implementation with data fabric 260 under control of local C-state controller 351, or other suitable data fabric circuits. Preferably the depicted process is supported in combination with the process of FIG. 6 to provide a capability to provide probe filter lookups for coherent requests from stuttering clients. Support for the entry process of FIG. 4 and the exit process of FIG. 5 is also advantageous to use in combination with the process of FIG. 6, FIG. 7, or both.

Referring to flowchart 700, the process begins at block 702 when the data fabric exits an idle state to service stuttering client data traffic. Stuttering clients are considered to be primarily non-coherent requestors on the data fabric, because the vast majority of their requests are not coherent requests. At the beginning of this scenario, the CPU clients are idle and only stuttering clients are active. This state may be detected by detecting a disconnect condition for fabric data ports that are coupled to requestors that are probe filter clients. While traffic from stuttering clients is typically non-coherent, a small percentage of traffic from such clients may be coherent. As such these clients are referred to as primarily non-coherent. Because such coherent requests are infrequent, the probe filter can exit the retention low power state to service such requests without incurring a deleterious additional latency performance penalty.

At block 704, a coherent slave controller receives a coherent request while the probe filter is in the retention low power state. Responsive to this coherent request, the coherent slave controller asserts the Wake signal to the local power state controller at block 706.

Then, at block 708, the local power state controller restores the clock signal to the probe filter, for example by operating clock gate 354 (FIG. 3). It then waits for the roundtrip signaling delay from the local power state controller to the coherent slave controller. After the wait, at block 710, the local power state controller signals the coherent slave controller to resume generating and servicing probe filter lookups for coherent requests by de-asserting the Disable signal. The sequence of blocks 702-710 is also suitable for exiting the retention low power state entered according to the process of FIG. 6.

At block 712, the local power state controller determines if the request is from a stuttering client. This determination is preferably based on the state of the data fabric and the port over which the request is received. If not, the process goes to block 713, where the probe filter is maintained in the operational state to service probe filter lookups. If so, the process goes to block 714, where the coherent slave services coherent requests from a stuttering client, generating probe filter lookups and receiving results from the probe filter. When the stutter client has completed its data transfer for the current cycle of stuttering, it signals to the local power state controller that the stutter data transfer is complete at block 716.

Responsive to this, at block 718 the local power state controller signals the coherent slave controller to disable probe filter lookups by asserting the Disable signal, and gates the clock signal to the probe filter to place it in the retention low power state. Then at block 720 the local power state controller causes the data fabric to re-enter the idle state, which continues until the next cycle of stutter client data transfer.

As can be understood, if a stuttering client does not make any coherent requests as shown at block 704, as is often the case during the C-state described above, the probe filter is not required to leave the retention low power state and additional power savings are realized.

SOC 210 of FIG. 2 or any portions thereof, such as data fabric 260, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. The various techniques used in conjunction with the retention low power state for the probe filter disclosed herein can be used independently or in conjunction with the other techniques. Moreover, different techniques and circuits can be used to detect the conditions responsive to which the retention low power state is entered.

Accordingly, it is intended by the appended claims to cover all modifications of the disclosed embodiments that fall within the scope of the disclosed embodiments.

What is claimed is:

1. A data processor comprising:
   a plurality of requestors;
   a plurality of responders; and
   a data fabric for routing requests between the plurality of requestors and the plurality of responders, the data fabric comprising:
      a crossbar router;
      a coherent slave controller coupled to the crossbar router;
      a probe filter coupled to the coherent slave controller and tracking the state of cached lines of memory; and
      power state control circuitry which, responsive to a condition eligible for a probe filter retention low power state, causes the probe filter to enter a retention low power state in which a clock signal to the probe filter is gated while power is maintained to the probe filter, wherein entering the retention low power state is performed when all in-process probe filter lookups are complete.

2. The data processor of claim 1, wherein, the coherent slave controller inhibits or disables new probe filter lookups and signals to the power state control circuitry when all in-process probe filter lookups are complete.

3. The data processor of claim 1, wherein the condition eligible for a probe filter retention low power state comprises a condition that all requestors that are probe filter clients have flushed their caches and entered an idle power state.

4. The data processor of claim 1, wherein the condition eligible for a probe filter retention low power state comprises a condition that the data fabric has entered an idle low power state.

5. The data processor of claim 1, wherein the condition eligible for a probe filter retention low power state comprise a condition that the data processor has entered a low power state in which only primarily non-coherent requestors are active.

6. The data processor of claim 4, wherein detecting the data processor has entered a low power state in which only primarily non-coherent requestors are active includes detecting a disconnect condition for fabric data ports that are coupled to requestors that are probe filter clients.

7. The data processor of claim 4, wherein:
the coherent slave controller transmits a wake signal to the power state control circuitry upon receiving a coherent cacheable request from a primarily non-coherent requestor; and
responsive to receiving the wake signal, the power state control circuitry causes the probe filter to leave the retention low power state.

8. The data processor of claim 1, wherein conditions that are separately eligible for a probe filter retention low power state include two or more of: a condition of all requestors that are probe filter clients flushing their caches, a condition of the data processor entering an idle power state, and a condition of the data processor entering a low power state in which only primarily non-coherent requestors are active.

9. The data processor of claim 7, wherein:
the requestors that are probe filter clients comprise central processing unit (CPU) cores; and
the primarily non-coherent requestors comprise display controllers or graphics controllers.

10. A method comprising:
at a data fabric of a data processor, routing requests between a plurality of requestors and a plurality of responders;
tracking the state of cached lines of memory at a probe filter coupled to the data fabric;
detecting a condition eligible for a probe filter retention low power state, and in response, commanding a coherent slave controller to inhibit or disable new probe filter lookups,
gating a clock signal fed to the probe filter.

11. The method of claim 10, further comprising receiving a signal from the coherent slave controller indicating that all probe filter lookups that were in process when the command to the coherent slave controller was received have been completed.

12. The method of claim 10, wherein the condition eligible for the probe filter retention low power state comprises all requestors that are probe filter clients having flushed their caches and entered an idle power state.

13. The method of claim 10, wherein the condition eligible for the probe filter retention low power state comprises the data processor entering a low power state in which only primarily non-coherent requestors are active.

14. The method of claim 13, wherein detecting the data processor entering a low power state in which only primarily non-coherent requestors are active includes detecting a disconnect condition for a plurality of data ports of the data fabric coupled to probe filter clients.

15. The method of claim 13, further comprising:
transmitting a wake signal from the coherent slave controller responsive to receiving a coherent cacheable request from a primarily non-coherent requestor while in the probe filter retention low power state; and
responsive to receiving the wake signal, causing the probe filter to leave the probe filter retention low power state and fulfill the coherent cacheable request.

16. A power state control circuit for controlling power states of a data fabric, comprising:
power state control circuitry operable, responsive to responsive to a condition eligible for a probe filter retention low power state, to cause a probe filter of the data fabric to enter a retention low power state in which a clock signal to the probe filter is gated while power is maintained to the probe filter; and
first clock gating circuitry coupled to the power state control circuitry for selectively gating a first clock signal to the probe filter;
second clock gating circuitry coupled to the power state control circuitry for selectively gating a second clock signal to the data fabric,
wherein, the coherent slave controller inhibits or disables new probe filter lookups and signals to the power state control circuitry when all in-process probe filter lookups are complete.

17. The power state control circuit of claim 16, wherein, the coherent slave controller inhibits or disables new probe filter lookups and signals to the power state control circuitry when all in-process probe filter lookups are complete.

18. The power state control circuit of claim 16, wherein the condition eligible for a probe filter retention low power state comprises a condition that all requestors that are probe filter clients having flushed their caches and entered an idle power state.

19. The power state control circuit of claim 16, wherein the condition eligible for a probe filter retention low power state comprises a condition that the data fabric has entered an idle low power state.

20. The power state control circuit of claim 16, wherein the condition eligible for a probe filter retention low power state comprises a host data processor entering a low power state in which only primarily non-coherent requestors are connected to the data fabric.

* * * * *